US008099586B2

(12) United States Patent
Chou et al.

(10) Patent No.: US 8,099,586 B2
(45) Date of Patent: Jan. 17, 2012

(54) BRANCH MISPREDICTION RECOVERY MECHANISM FOR MICROPROCESSORS

(75) Inventors: Yuan C. Chou, Los Gatos, CA (US);
Robert T. Golla, Round Rock, TX (US);
Mark A. Luttrell, Cedar Park, TX (US);
Paul J. Jordan, Austin, TX (US);
Manish Shah, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 427 days.

(21) Appl. No.: 12/346,349

(22) Filed: Dec. 30, 2008

(65) Prior Publication Data

US 2010/0169611 A1 Jul. 1, 2010

(51) Int. Cl.
*G06F 9/00* (2006.01)
(52) U.S. Cl. ........................ 712/233; 712/239
(58) Field of Classification Search .................. None
See application file for complete search history.

(56) References Cited

U.S. PATENT DOCUMENTS

| 5,812,839 | A | | 9/1998 | Hoyt et al. | |
|---|---|---|---|---|---|
| 5,838,962 | A | | 11/1998 | Larson | |
| 6,016,542 | A | * | 1/2000 | Gottlieb et al. | 712/225 |
| 6,260,138 | B1 | | 7/2001 | Harris | |
| 6,272,520 | B1 | * | 8/2001 | Sharangpani et al. | 718/108 |
| 6,701,426 | B1 | | 3/2004 | Ries et al. | |
| 6,948,054 | B2 | | 9/2005 | Worrell | |
| 7,130,991 | B1 | * | 10/2006 | Butler | 712/241 |
| 2002/0091914 | A1 | * | 7/2002 | Merchant et al. | 712/219 |
| 2008/0177992 | A1 | * | 7/2008 | Smith et al. | 712/233 |
| 2009/0019317 | A1 | * | 1/2009 | Quach et al. | 714/47 |

* cited by examiner

*Primary Examiner* — Jacob A Petranek
(74) *Attorney, Agent, or Firm* — Rory D. Rankin; Meyertons, Hood, Kivlin, Kowert & Goetzel, P.C.

(57) ABSTRACT

A system and method for reducing branch misprediction penalty. In response to detecting a mispredicted branch instruction, circuitry within a microprocessor identifies a predetermined condition prior to retirement of the branch instruction. Upon identifying this condition, the entire corresponding pipeline is flushed prior to retirement of the branch instruction, and instruction fetch is started at a corresponding address of an oldest instruction in the pipeline immediately prior to the flushing of the pipeline. The correct outcome is stored prior to the pipeline flush. In order to distinguish the mispredicted branch from other instructions, identification information may be stored alongside the correct outcome. One example of the predetermined condition being satisfied is in response to a timer reaching a predetermined threshold value, wherein the timer begins incrementing in response to the mispredicted branch detection and resets at retirement of the mispredicted branch.

17 Claims, 9 Drawing Sheets

BRANCH MISPREDICTION RECOVERY MECHANISM FOR MICROPROCESSORS

BACKGROUND OF THE INVENTION

1. Field of the Invention

This invention relates to microprocessors, and more particularly, to efficient reduction in branch misprediction penalty.

2. Description of the Relevant Art

Modern processor cores, or processors, are pipelined in order to increase throughput of instructions per clock cycle. However, the throughput may be reduced by pipeline stalls, which may be caused by a branch misprediction, a cache miss, data dependency, or other, wherein no useful work may be performed for a particular instruction during a clock cycle. Different techniques are used to fill these unproductive cycles in a pipeline with useful work. Some examples include loop unrolling of instructions by a compiler, branch prediction mechanisms within a core, and out-of-order execution within a core.

An operating system may divide a software application into processes and further divide processes into threads. A thread is a sequence of instructions that may share memory and other resources with other threads and may execute in parallel with other threads. A processor core may be constructed to execute more than one thread per clock cycle in order to increase efficient use of the hardware resources and reduce the effect of stalls on overall throughput. A microprocessor may include multiple processor cores to further increase parallel execution of multiple instructions per clock cycle.

As stated above, a processor core may comprise a branch prediction mechanism in order to continue fetching and executing subsequent instructions when the outcome of a branch instruction is not yet known. When the branch is predicted correctly, the processor core benefits from the early fetch and execution of the subsequent instructions. No corrective action is required. However, when a branch instruction is mispredicted, recovery needs to be performed. The cost, or the penalty, for this recovery may be high for modern processors.

Branch misprediction recovery comprises restoring the architectural state (i.e. internal core register state and memory state) of the processor to the architectural state at the point of the completed branch instruction. In other words, the effects of incorrectly executing the instructions subsequent to the mispredicted branch instruction need be undone. Then instruction fetch is restarted at the correct branch target address.

The penalty for the branch misprediction, or simply the branch misprediction penalty, includes two components. The first component is the time, or the number of clock cycles, spent on speculative execution of fetched instructions within the same thread or process subsequent the branch instruction until the branch misprediction is detected. The second component is the time, or the number of clock cycles, to restart the pipeline with the correct instructions once the branch misprediction is detected. Modern processor core designs increase both of these components with deep pipelines and with large instruction fetch, dispatch, and issue windows.

To support the out-of-order execution and completion of instructions as well as maintaining precise interrupts, modern processors typically buffer the data results of executed instructions in a working register file (WRF). Different implementations of a WRF may include a reservation station, a future file, a reorder buffer, or other. When an instruction retires due to being the oldest instruction in the processor and its execution did not result in any exceptions, its corresponding data results are then transferred from the WRF to the architectural register file (ARF). For such processors, the simplest branch misprediction recovery mechanism is to wait for the mispredicted branch instruction to retire, and then flush, or clear, both the entire processor pipeline and the WRF. Afterwards, instruction fetch restarts at the correct branch target address.

A disadvantage of the above approach is the branch misprediction penalty may be high. A relatively large number of clock cycles may be used before the mispredicted branch instruction is able to retire. For example, an older (earlier in program order than the mispredicted branch instruction) load instruction may require a long latency main memory access due to a cache miss, and, therefore, cause a long wait before both the load instruction and subsequently the mispredicted branch instruction are able to retire. Then processing of instructions beginning at the correct branch target address is delayed.

Another more complex approach is a branch misprediction recovery mechanism that selectively flushes both the processor pipeline and the WRF as soon as a branch misprediction is detected and not when the mispredicted branch instruction retires. Specifically, only the instructions that are younger (later in program order) than the mispredicted branch instruction are flushed from both the pipeline and the WRF. Then the mechanism restarts instruction fetch at the correct branch target address. This alternative mechanism allows the instructions at the branch target address to be processed sooner. However, this mechanism is significantly more complex. Maintaining precise interrupts in modern processors is already expensive due to deep pipelining. A large amount of hardware is typically required. Handling a branch misprediction with the above complex mechanism may further increase the amount of needed hardware, which increases both on-die area and wire route lengths, which increases on-die noise effects and signal transmission delays, and resultantly may diminish overall performance.

In view of the above, efficient methods and mechanisms for reducing branch misprediction penalty are desired.

SUMMARY OF THE INVENTION

Systems and methods for reducing branch misprediction penalty are contemplated. In one embodiment, a method comprises predicting an outcome of a fetched branch instruction, and in response to a detection of the branch instruction is mispredicted, identifying a predetermined condition prior to retirement of the branch instruction. Upon identifying this condition, the entire corresponding pipeline is flushed prior to retirement of the branch instruction, and instruction fetch is started at a corresponding address of an oldest instruction in the pipeline immediately prior to the flushing of the pipeline.

The predetermined condition may be satisfied in response to a timer reaches a predetermined threshold value, wherein the timer begins incrementing in response to the detection of the mispredicted branch and resets at retirement of the mispredicted branch. If the mispredicted branch requires too much time to retire, then the entire pipeline is flushed in order to expedite execution at the correct branch target address. Other time restraints may be enforced with other times, such as the time required between retiring consecutive instructions between the detection of the mispredicted branch and the retirement of the mispredicted branch.

Another predetermined condition implemented alone or in combination with the above time constraint conditions may be satisfied in response to a detection of a long latency instruction, wherein the long latency instruction is an instruction requiring more clock cycles to complete than a predetermined latency threshold. For example, a load operation with a cache miss may qualify. In addition to flushing and restarting the pipeline, this long latency load instruction may be converted to a prefetch operation in order to increase performance.

Rather than use branch prediction logic during the re-execution of the mispredicted branch, the correct outcome may have been stored prior to the pipeline flush. In order to distinguish the mispredicted branch from other instructions, identification information may be stored alongside the correct outcome.

In another embodiment, an instruction fetch unit (IFU) within a microprocessor may have circuitry to perform some of the above steps while sharing tasks with circuitry in both an execution unit and a retirement unit.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

Figure 1:
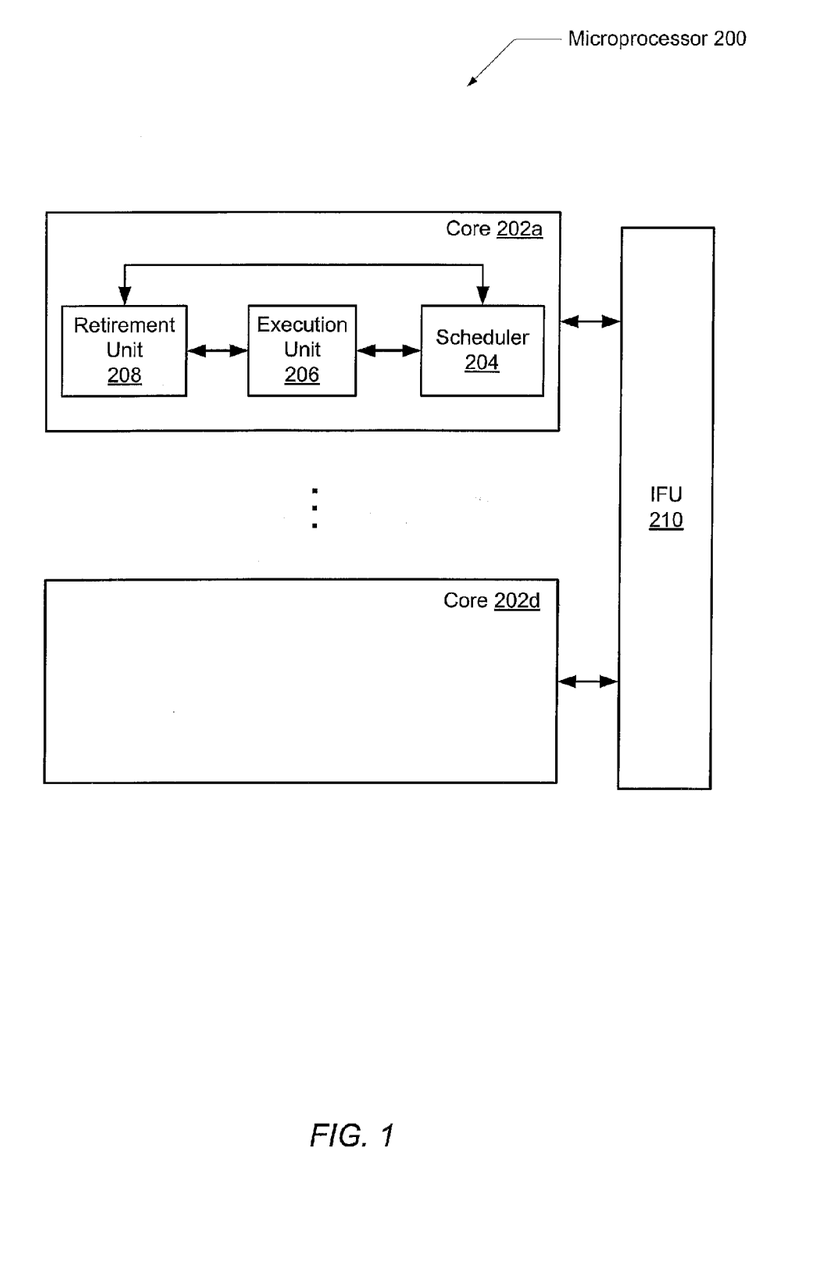
FIG. 1 is a generalized block diagram illustrating one embodiment of a microprocessor.

FIG. 1 illustrates one embodiment of a microprocessor 200. Microprocessor 200 may comprise multiple cores 202a-202d. As used herein, elements referred to by a reference numeral followed by a letter may be collectively referred to by the numeral alone. For example, processing cores 202a-202d may be collectively referred to as processing cores 202, or cores 202. Each core 202 may include a superscalar microarchitecture with a multi-stage pipeline. In addition, each core 202 may perform out-of-order execution of instructions of a software application, or a computer program. Also, each core 202 may be configured to execute instructions for two or more strands simultaneously. In other embodiments, each core 202 may be able to execute one, four, or another number of strands simultaneously.

The program code may comprise a sequence of basic blocks. For purposes of discussion, a basic block may be defined as a straight-line sequence of instructions within a program, whose head, or first instruction, is jumped to from another line of code, and which ends in an unconditional control flow transfer such as a jump, call, or return. Within a basic block a conditional control flow transfer may exist such as a branch instruction.

Branch instructions comprise many types such as conditional or unconditional and direct or indirect. A conditional branch instruction performs a determination of which path to take in an instruction stream. If the branch instruction determines a specified condition, which may be encoded within the instruction, is not satisfied, then the branch instruction is considered to be not-taken and the next sequential instruction in a program order is executed. However, if the branch instruction determines a specified condition is satisfied, then the branch instruction is considered to be taken. Accordingly, a subsequent instruction which is not the next sequential instruction in program order, but rather is an instruction located at a branch target address, is executed. An unconditional branch instruction is considered an always-taken conditional branch instruction. There is no specified condition within the instruction to test, and execution of subsequent instructions may occur in a different sequence than sequential order.

In addition, a branch target address may be specified by an offset, which may be stored in the branch instruction itself, relative to the linear address value stored in the program counter (PC) register. This type of branch target address is referred to as direct. A branch target address may also be specified by a value in a register or memory, wherein the register or memory location may be stored in the branch instruction. This type of branch target address is referred to as indirect. Further, in an indirect branch instruction, the register specifying the branch target address may be loaded with different values.

Examples of unconditional indirect branch instructions include procedure calls and returns that may be used for implementing subroutines in program code, and that may use a Return Address Stack (RAS) to supply the branch target address. Another example is an indirect jump instruction that may be used to implement a switch-case statement, which is popular in object-oriented programs such as C++ and Java.

An example of a conditional branch instruction is a branch instruction that may be used to implement loops in program code (e.g. "for" and "while" loop constructs). Conditional branch instructions must satisfy a specified condition to be considered taken. An example of a satisfied condition may be a specified register now holds a stored value of zero. The specified register is encoded in the conditional branch instruction. This specified register may have its stored value decrementing in a loop due to instructions within software application code. The output of the specified register may be input to dedicated zero detect combinatorial logic.

In one embodiment, an instruction fetch unit (IFU) 210 fetches instructions from memory, which may include a first-level instruction-cache (i-cache) and a corresponding instruction translation-lookaside-buffer (i-TLB). The i-cache and i-TLB may be placed within processor 200. In other embodiments, they may be placed outside microprocessor 200. The instruction i-cache and i-TLB may store instructions and addresses respectively in order to access the instructions for a software application. In one embodiment, the IFU 210 may fetch multiple instructions from the i-cache per clock cycle if there are no i-cache or i-TLB misses.

In one embodiment, one or more additional levels of caches may be present between the first-level i-cache and a memory controller not shown. Memory controllers may be coupled to lower-level memory, which may include other levels of cache on the die outside the microprocessor, dynamic random access memory (DRAM), dual in-line memory modules (dimms) in order to bank the DRAM, a hard disk, or a combination of these alternatives.

The IFU 210 may include a program counter that holds a pointer to an address of a memory line containing the next instruction(s) to fetch from the i-cache. This address may be compared to addresses in the i-TLB. In one embodiment, an address of a speculative fetch may be derived from the address in the program counter. The address of the speculative fetch may be sent to the i-TLB in the same clock cycle as the program counter value or a subsequent clock cycle. The embodiment to be chosen may depend on the number of ports in both the i-cache and the i-TLB. In one embodiment, the address of the speculative fetch may be the address of the next line in memory from the memory line corresponding to the program counter value. In another embodiment, the address of either the value to be stored in the program counter or the speculative fetch may be an output of a branch predictor or other buffer such as a branch outcome buffer. The output of a branch outcome buffer, under certain conditions, may have precedence over the output of a branch predictor.

The IFU 210 may also include a branch prediction unit to predict an outcome of a conditional control flow instruction, such as a director or indirect branch instruction, prior to an execution unit determining the actual outcome in a later pipeline stage. Logic to calculate a branch target address may also be included in IFU 210. The IFU 210 may need to fetch instructions for multiple strands. For example, there may be 4 cores 202 and each core 202 may be capable of executing 2 strands simultaneously. Therefore, the IFU 210 may need to monitor the instruction fetch requirements including speculative fetch and branch prediction of 8 different strands.

Each core 202 may comprise a pipeline that includes a scheduler 204, an execution unit 206, and a retirement unit 208. For purposes of discussion, the functionality and placement of blocks in this embodiment are shown in a certain manner. However, some functionality or logic may occur in a different block than shown. Additionally, some blocks may be combined or further divided in another embodiment. For example, a decoder unit may be included in the IFU 210 or in the scheduler 204. The decoder unit decodes the opcodes of the one or more fetched instructions per clock cycle. In one embodiment, the instructions may be pre-decoded prior to arriving to the decoder. The instructions may be stored in the i-cache in the pre-decoded format or the instructions may be pre-decoded in the IFU 210.

After decoding, both data and control signals for the instruction may be sent to a buffer within the scheduler 204 of the appropriate strand. In one embodiment, scheduler 204 may allocate multiple entries per clock cycle in a reorder buffer included in the retirement unit 208. The reorder buffer may be designated as a working register file (WRF). In another embodiment, the decoder unit may perform this allocation. The reorder buffer may be configured to ensure in-program-order retirement of instructions. The scheduler 204 may include circuitry referred to as reservation stations where instructions are stored for later issue and register renaming may occur. The allocation of entries in the reservation stations is considered dispatch.

Scheduler 204 may retrieve source operands of an instruction from an architectural register file (ARF) or the WRF included in the retirement unit 208. Also, the source operands may be retrieved from the result buffers or buses within the execution unit 206. The scheduler 204 may issue instructions to the execution unit 206 when the source operands of the instruction are ready and an available functional unit is ready within the execution unit 206 to operate on the instruction. The scheduler 204 may issue multiple instructions per clock cycle and may issue the instructions out-of-program-order.

These instructions may be issued to integer and floating-point arithmetic functional units, a load/store unit, or other within the execution unit 206. The functional units may include arithmetic logic units (ALUs) for computational calculations such as addition, subtraction, multiplication, division, and square root. Logic may be included to determine an outcome of a flow control conditional instruction. The load/store unit may include queues and logic to execute a memory access instruction.

Results from the functional units and the load/store unit within the execution unit 206 may be presented on a common data bus in order to retire instructions and to bypass data to dependent instructions. The results may be sent to the reorder buffer, or WRF, in the retirement unit 208. In one embodiment, the reorder buffer may be implemented as a first-in first-out (FIFO) queue that ensures in-order retirement of instructions according to program order. Here, an instruction that receives its results is marked for retirement. If the instruction is head-of-the-queue, it may have its results sent to the ARF within the retirement unit 208 or other unit depending on the implementation of the design. The ARF may hold the architectural state of the general-purpose registers (GPRs) of the core 202.

Figure 2:
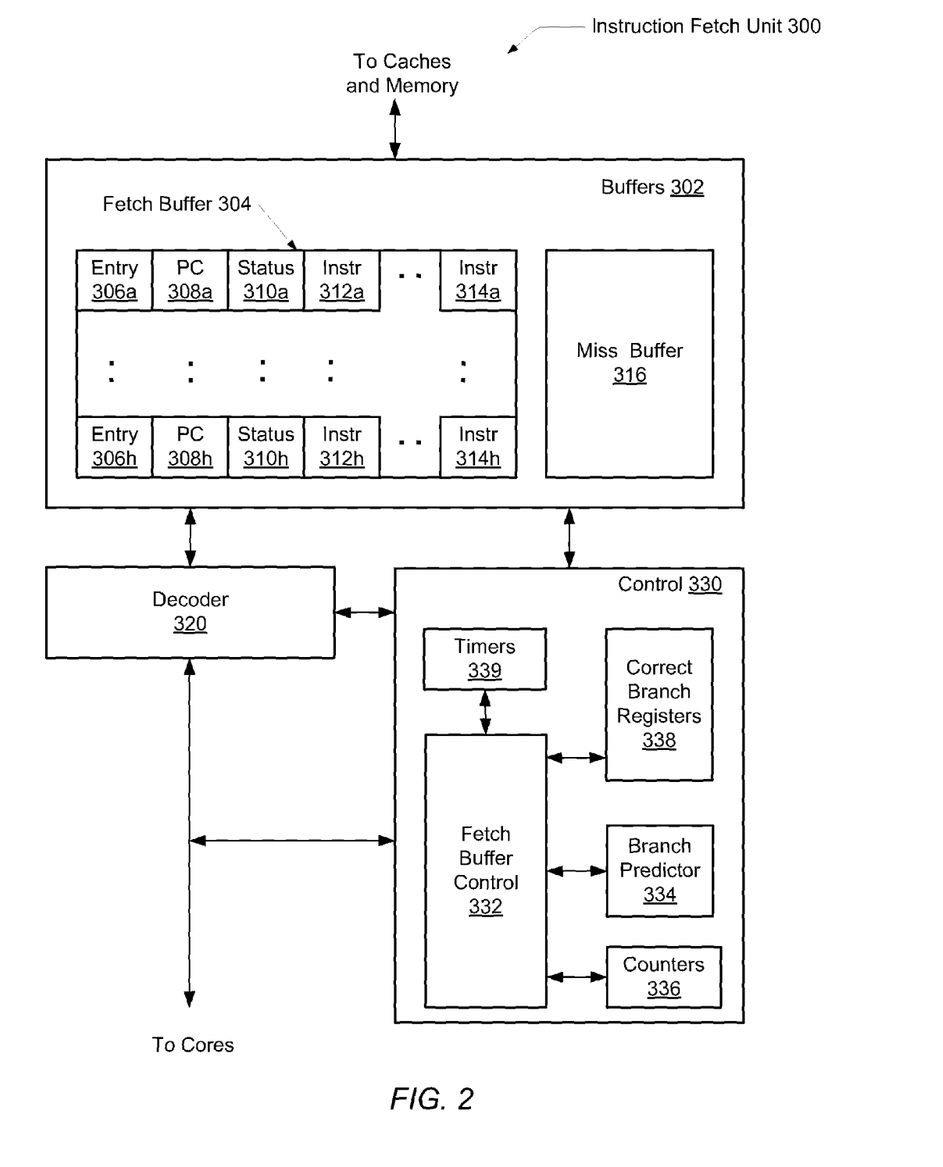
FIG. 2 is a generalized block diagram illustrating one embodiment of an instruction fetch unit (IFU).

Referring now to FIG. 2, one embodiment of an instruction fetch unit (IFU) 300 is shown. A set of buffers 302 may be included in the IFU 300. The set 302 may include a fetch buffer 304 and a miss buffer 316. The fetch buffer 304 may be used to store memory data of a memory line when it arrives from memory or from the instruction cache. The memory access requests may arrive from a core and also may be derived within the IFU 300 as speculative requests dependent on the core requests. In alternative embodiments, the fetch buffer 304 may be divided into several buffers in order to allow each strand of a particular core to have its own buffer. Also, circuitry limitations may determine the division of the buffer and the specific chosen implementation of fetch buffer 304.

In one embodiment, each entry of the fetch buffer 304 may have an entry number 306, and the address of the instruction memory request, or the program counter 308. Status information 310 may include a valid bit, the strand number, a bit to signify the request is still waiting on hit or miss information, and other status information. One or more instructions, 312 and 314, returned from a memory on a cache hit may be included. In one embodiment, a memory line may comprise 64 bytes containing 16 instructions.

The miss buffer 316 may be used to store instruction memory requests that missed the first-level cache. In one embodiment, the miss buffer 316 may be a separate buffer from the fetch buffer 304 due to circuit constraints or different functional needs. Miss buffer 316 may enqueue instruction miss requests that are generated on a per strand basis either from instruction accesses or the translation look-aside buffer. Once data is returned from lower level caches or a memory management unit, control logic within miss buffer 316 may generate control signals to route the incoming data to the instruction cache or translation buffer. Data destined for the instruction cache may also be forwarded to the fetch buffer 304.

In one embodiment, a fetch buffer control 332 may be used to monitor the memory access requests on a per strand basis. The combinatorial logic within the fetch buffer control 332 may use the values in the counters 336 to monitor and maintain the number of allowable memory requests, or credits, each strand possesses at a given time. When multiple strands simultaneously have memory access requests and sufficient credits to make a request, the fetch buffer control 332 decides which requests occur first. In one embodiment, a round-robin scheme may be used. In alternative embodiments, the least-requesting strand or the most-requesting strand may be chosen, or another priority scheme may be used.

As mentioned above, a decoder 320 may be included in the IFU 300 or in the scheduler 204 of a core. The decoder 320 decodes the opcodes of the one or more fetched instructions per clock cycle. In one embodiment, the instructions may be pre-decoded prior to arriving to the decoder 320. A control block 330 in the IFU 300 may include a branch predictor 334 to predict an outcome of a control flow instruction prior to an execution unit determining the actual outcome in a later pipeline stage. Logic to calculate a branch target address may also be included.

The exact stage as to when the prediction is ready is dependent on the pipeline implementation. In order to predict a branch condition, the PC used to fetch the instruction from memory, such as from the i-cache, may be used to index branch prediction logic. One example of an early combined prediction scheme that uses the PC is the gselect branch prediction method described in Scott McFarling's 1993 paper, "Combining Branch Predictors", Digital Western Research Laboratory Technical Note TN-36, incorporated herein by reference in its entirety. The linear address stored in the PC may be combined with values stored in a global history register in a hashing function. The output of the hashing function and the PC may be used to index prediction tables such as a pattern history table (PHT), a branch target buffer (BTB), or otherwise. The update of the global history register with branch target address information of a current branch instruction, rather than a taken or not-taken direction prediction, may increase the prediction accuracy of both conditional branch direction predictions (i.e. taken and not-taken outcome predictions) and indirect branch target address predictions, such as a BTB prediction or an indirect target array prediction. Many different schemes may be included in various embodiments of branch prediction mechanisms.

In one embodiment, a branch misprediction may be determined in the execution unit 206. During recovery, all or part of the pipeline may be flushed and the correct branch outcome (e.g. the correct taken/not-taken direction for a direct conditional branch or the correct target address for an indirect branch) of the mispredicted branch may be stored in the non-speculative, or correct, branch registers 338. For example, the outcome of the mispredicted branch may be saved in a logical structure called the Branch Outcome Buffer within registers 338. For conditional branches, the direction of the branch is saved in the Branch Outcome Buffer, while for indirect branches, the target address of the branch is saved in the Branch Outcome Buffer. In one embodiment, the Branch Outcome Buffer may be implemented as two separate structures, wherein one structure is for conditional branches and a second structure is for indirect branches. In another embodiment, the Branch Outcome Buffer may be implemented as a single structure that stores outcomes for both conditional direct and indirect branches. In other embodiments, the outcomes of older (earlier in program order) non-retired branches may be stored in registers 338. More details are described shortly.

Timers 339 may be used to determine the number of clock cycles elapsed since a branch misprediction was detected. Alternatively, timers 339 may be used to determined the number of clock cycles elapsed between the retirement of instructions subsequent the detection of a branch misprediction. More details are described shortly.

Figure 3:
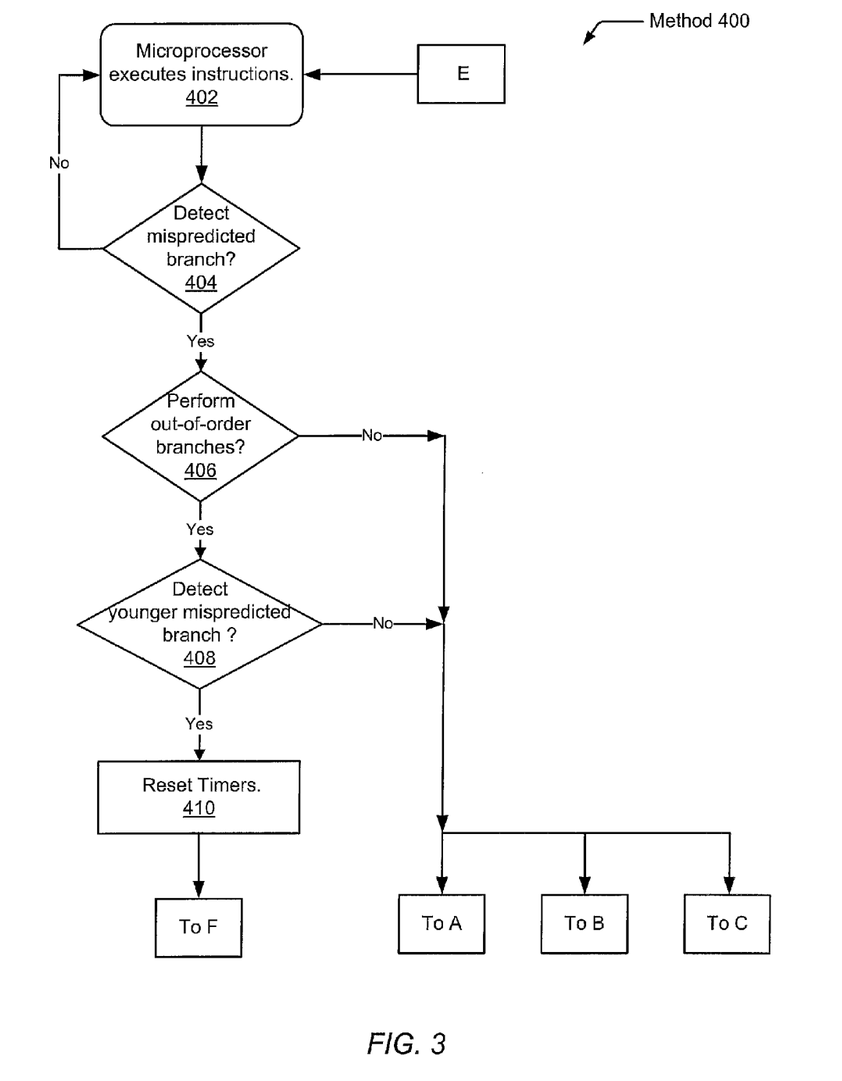
FIG. 3 is a flow diagram illustrating one embodiment of a method for detecting a branch misprediction.

Turning now to FIG. 3 to FIG. 9, embodiments of methods for reducing branch misprediction penalty are shown. For purposes of discussion, individual steps in these embodiments are shown in sequential order. However, some steps may occur in a different order than shown, some steps may be performed concurrently, some steps may be combined with other steps, and some steps may be absent in another embodiment. Referring to FIG. 3, one embodiment of a method 400 for detecting a branch misprediction is shown. In one embodiment, a microprocessor discussed regarding methods 400 to 900 in FIG. 3 to FIG. 9 may be a superscalar out-of-order machine such as microprocessor 200 of FIG. 1. In such an embodiment, in order to support the out-of-order completion of instructions as well as precise interrupts, the results of executed instructions may be buffered in a working register file (WRF). The results are then transferred to an architectural register file (ARF) when the instruction that generated the result retires (i.e. it is the oldest instruction in the processor that has not yet retired and its execution did not result in any exceptions).

In the case of exceptions, it is well known to those skilled in the art that certain control registers need to be reinitialized, or set to a particular value, and execution may be directed to a software routine such as an exception handler. Many possible embodiments exist for handling exceptions in modern microprocessors as known to those skilled in the art. It is beyond the scope of discussion to include details of these routines, but each is possible and contemplated. For ease of discussion, the steps below for methods 400 to 800 shown in FIG. 3 to FIG. 9 do not illustrate individual steps taken for exception handling or other interruptions to typical program flow. Rather, the below discussion focuses on steps required for efficient reduction in branch misprediction penalty.

A microprocessor may fetch and execute instructions of a computer program from an i-cache in block 402. In one embodiment, an IFU 300 may be utilized to fetch the instructions wherein the instructions are later issued to an execution unit 206.

An instruction may be a branch instruction that has its outcome (e.g. a taken/not-taken direction for a direct conditional branch or a target address for an indirect branch) predicted by branch predictor 334. Later in the pipeline, such as in execution unit 206, if the branch instruction is determined to be mispredicted (conditional block 404), then method 400 may take steps to reduce the branch misprediction penalty. In one embodiment, a microprocessor 200 may be configured to perform out-of-order execution of instructions, but perform in-order execution of branch instructions (conditional block 406). If method 400 supports in-order execution of branch instructions, then in order to reduce the branch misprediction penalty of a current branch instruction, one or more of control blocks A, B, and C may be chosen and processed simultaneously. Methods 500, 600, 620, and 700 show the steps taken for these control blocks.

If method 400 supports out-of-order execution of branch instructions (conditional block 406), then a condition may occur wherein a younger branch instruction (i.e. later in program order than the current mispredicted branch instruction) had already been issued wherein prediction information was utilized, the younger branch subsequently executed, and a misprediction was detected. Therefore, control flow for method 400 had already moved to one of control blocks A, B, or C for this younger branch instruction. If such a condition is detected (conditional block 408), then any timers 339 used for the younger instruction are reset and control flow of method 400 moves to control block F, which is described by method 800.

Figure 4:
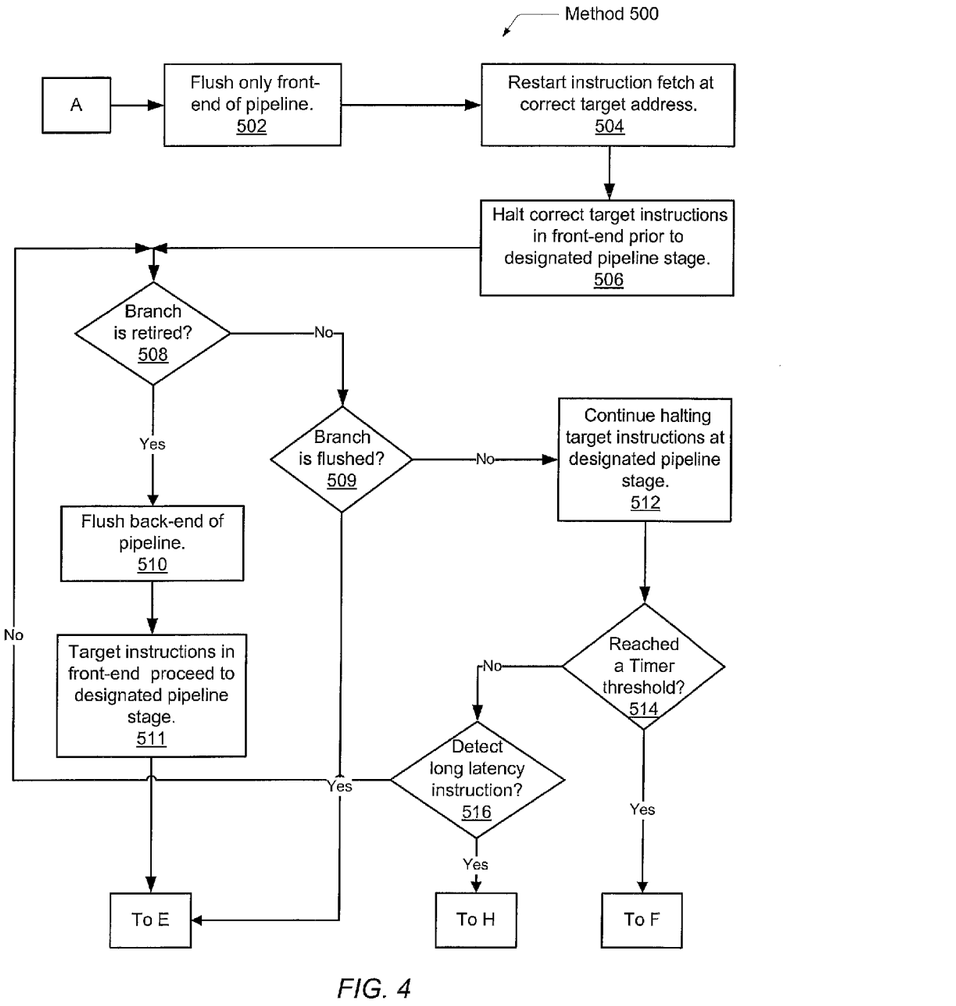
FIG. 4 is a flow diagram illustrating one embodiment of a method for enabling the microprocessor to execute correct instructions sooner when the time to branch retirement is short.

Turning now to FIG. 4, one embodiment of a method 500 is shown for enabling the microprocessor to execute correct instructions sooner when the time to branch retirement is short. After a branch misprediction is detected and control block A is chosen, only the front-end of the pipeline is flushed, rather than the entire pipeline, in block 502. In one embodiment, in order to simplify the design of control circuitry, a designated pipeline stage may be chosen wherein all instructions within a particular thread are flushed. One example of a designated pipeline stage is the stage that performs register renaming. The instructions that have not yet been renamed may be flushed and instruction fetch is immediately re-started at the correct target address of the mispredicted branch in block 504. However these newly fetched instructions are prevented from being renamed until the mispredicted branch is retired. Therefore, these instructions are halted in block 506 prior to the designated pipeline stage such as the renaming stage.

When the mispredicted branch is retired (conditional block 508), the instructions in the back-end of the processor pipeline (i.e. the incorrect speculative instructions subsequent the mispredicted branch in program order that have already been renamed) are flushed in block 510. The newly fetched correct instructions in the front-end of the processor pipeline that were halted in block 506 may now proceed to the designated pipeline stage, such as the register renaming stage, and proceed to execution in block 511. Then control flow of method 500 moves to control block E and returns to block 402 of method 400 where the microprocessor is executing instructions of the program code.

The above optimization may enable the processor to execute the correct instructions sooner, thereby effectively reducing the branch misprediction penalty in the case where the mispredicted branch retirement was not delayed. However, if the processor pipeline is flushed because the retirement of the mispredicted branch is delayed or for another reason, then these newly fetched instructions are also flushed. For example, if the detected mispredicted branch instruction has not retired (conditional block 508), it may be due to an earlier exception. If the processor pipeline experiences an exception due to an older (earlier in program order than the mispredicted branch instruction) instruction, then the mispredicted branch instruction may already be flushed from the pipeline (conditional block 509). In one embodiment, the program counter (PC) value to use for instruction fetching may utilize a predetermined exception handler address. Control flow of method 500 then moves to control block E and returns to block 402 of method 400 where the microprocessor is executing instructions.

It is noted that the detection of an exception is not limited to conditional block 509, which is shown for illustrative purposes. The detection may occur between any two steps of methods 400 to 900 or simultaneously with a particular step. Also, steps taken following such detection, such as reinitializing particular control registers, are not specifically shown since many embodiments are possible and contemplated.

Continuing with method 500, if the mispredicted branch instruction has not already been flushed from the pipeline (conditional block 509), then the newly fetched correct instructions may continue to be halted prior to the designated pipeline stage in block 512. If a timer, such as a timer in timers 339, reaches a predetermined timer threshold value (conditional block 514), then flow control of method 500 moves to control block F, which is further described regarding method 800. In one embodiment, the respective timer in timers 339 may be reset at this time. In an alternative embodiment, the respective timer in timers 339 may be initialized at the time it used again later.

Figure 5A:
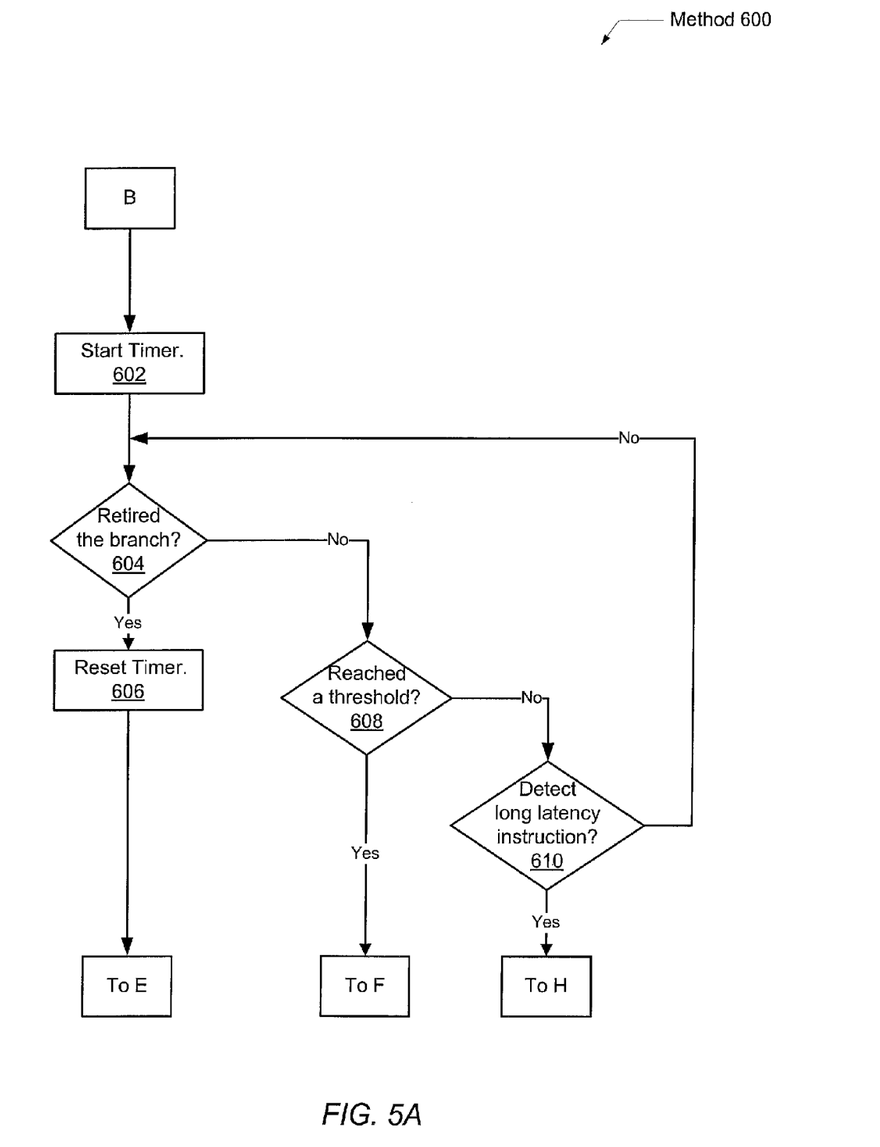
FIG. 5A is a flow diagram illustrating one embodiment of a method for detecting a long branch retirement.
Figure 5B:
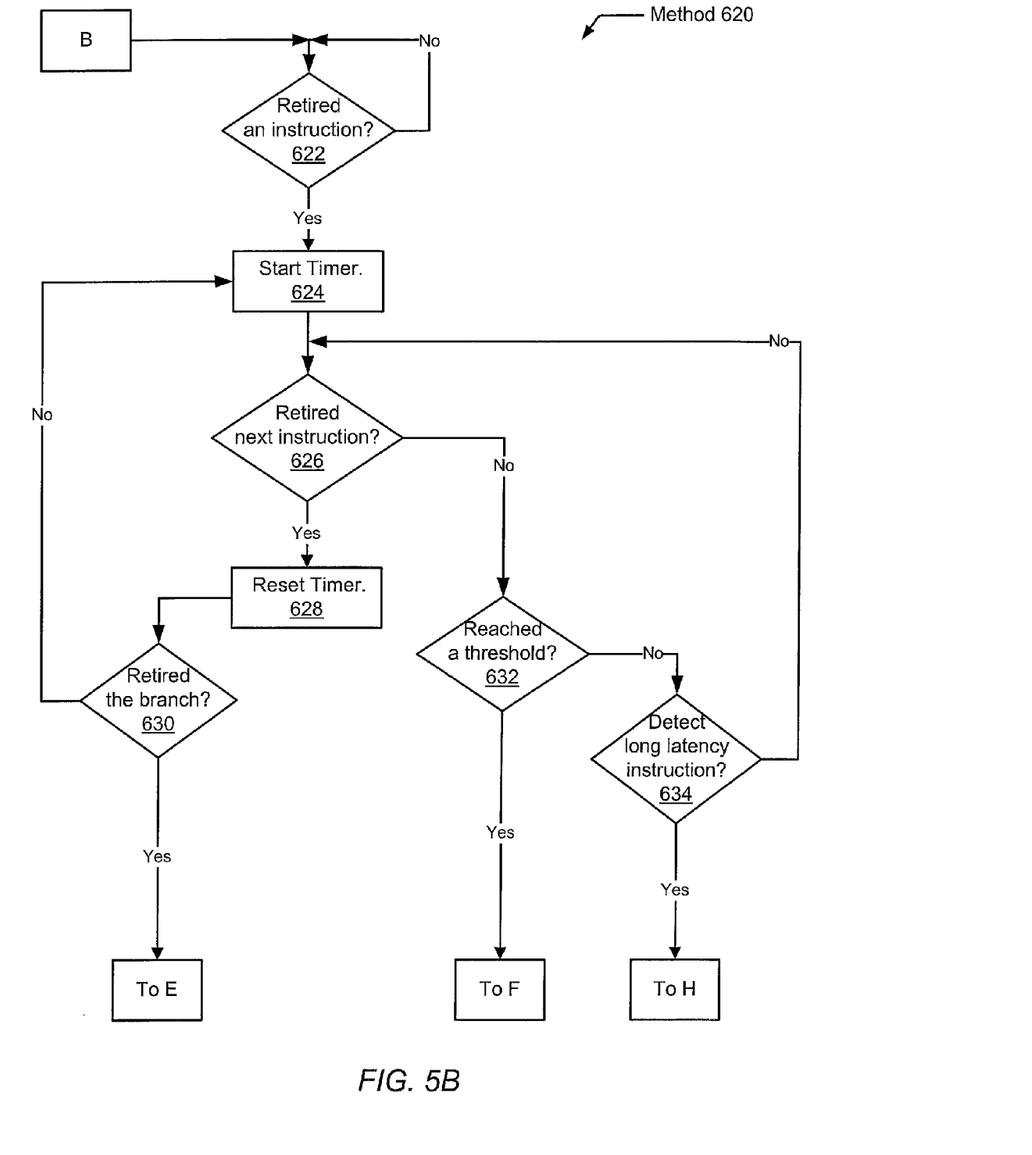
FIG. 5B is a flow diagram illustrating one embodiment of a method for detecting a long branch retirement due to intermediate instruction delays.

The time value of a timer within timers 339 is further described shortly regarding methods 600 and 620. If a timer does not reach a predetermined timer threshold value (conditional block 514), then separate control logic may detect a long latency instruction in conditional block 516. A long latency instruction may be an instruction that requires a predetermined large number of clock cycles such as a multiply instruction, a divide instruction, a memory access instruction, such as a load or a store operation, that needs to access lower-level memory due to a cache miss, or other. If a long latency instruction is detected (conditional block 516), then control flow of method 500 moves to control block H, which is further described regarding method 700.

If no long latency instruction is detected (conditional block 516), then control flow of method 500 returns to conditional block 508. In one embodiment, only one test between conditional blocks 514 and 516, may be implemented. In another embodiment, both tests may be implemented, but the order of detection may be reversed.

Referring now to FIG. 5A, one embodiment of a method 600 for detecting a long branch retirement is shown. When a branch instruction is determined to be mispredicted and control flow reaches control block B, a timer within timers 339 may be started in block 602. Alternatively, a timer within timers 339 may be initialized or reset, and subsequently started in block 602. The particular timer may incrementally count a number of clock cycles. Other implementations are possible and contemplated. If the mispredicted branch is retired (conditional block 604), then the timer is reset to a predetermined starting value, such as 0, in block 606. Alternatively, the particular timer within timers 339 may be initialized or reset in block 602, rather than in block 606, and subsequently started again when control flow of method 600 reaches block 602 again. Subsequently, in one embodiment, typical actions may be taken upon retirement of the mispredicted branch instruction such as flushing the entire pipeline and the working register file (WRF). The program counter (PC) value to use for instruction fetching may utilize the correct branch target address. Control flow of method 600 then moves to control block E and returns to block 402 of method 400 where the microprocessor is executing instructions of the program code.

If the mispredicted branch instruction has not retired (conditional block 604), then control logic detects whether the particular timer has reached a predetermined threshold value (conditional block 608). If this threshold value has been reached (conditional block 608), then control flow of method 600 moves to control block F, which is further described regarding method 800. As will be seen regarding method 800, it may be beneficial to flush the processor pipeline when the mispredicted branch is unable to retire after a pre-determined amount of time. After the pipeline flush, instruction fetch is restarted with the oldest instruction in the processor. While this oldest instruction and the subsequent instructions up to the mispredicted branch need to be re-fetched and re-executed, the correct instructions after the mispredicted branch at the correct branch target address of the mispredicted branch are not held up from being processed.

If the timer has not reached a predetermined threshold value (conditional block 608), then separate control logic may detect a long latency instruction in conditional block 610. As described before a long latency instruction may be an instruction that requires a predetermined large number of clock cycles such as a multiply instruction, a divide instruction, a memory access instruction, such as a load or a store operation, that needs to access lower-level memory due to a cache miss, or other. If a long latency instruction is detected (conditional block 610), then control flow of method 600 moves to control block H, which is further described regarding method 700.

If no long latency instruction is detected (conditional block 610), then control flow of method 600 returns to conditional block 604. In one embodiment, only the test in conditional blocks 608 regarding a timer, may be implemented. In another embodiment, both tests may be implemented, but the priority of the order of detection may be reversed.

Turning now to FIG. 5B, one embodiment of a method 620 for detecting a long branch retirement due to intermediate instruction delays is shown. When a branch instruction is determined to be mispredicted and control flow reaches control block B, either method 600, method 620, or both methods may be implemented. For example, method 600 may determine the mispredicted branch is surpassing a predetermined amount of time to retire in general. Method 620 may determine any prior instruction in program order to the branch instruction surpasses a predetermined amount of time to retire.

When a prior instruction retires (conditional block 622), in one embodiment, a timer within timers 339 may begin incrementing in block 624. If the next sequential instruction in program order retires (conditional block 626), then the timer may be reset in block 628. Next, if the mispredicted branch instruction retires (conditional block 630), for example, multiple instructions may retire in one clock cycle, then, in one embodiment, subsequently, typical actions may be taken such as flushing the entire pipeline and the working register file (WRF). The program counter (PC) value to use for instruction fetching may utilize the correct branch target address. Control flow of method 620 then moves to control block E. There control flow returns to block 402 of method 400 where the microprocessor is executing instructions of the program code. Otherwise, if the mispredicted branch instruction has not retired (conditional block 630), then control flow of method 620 returns to block 624 and the timer is started again.

If the next sequential instruction in program order has not retired (conditional block 626), then control logic may detect whether the particular timer has reached a predetermined threshold value (conditional block 632). If this threshold value has been reached (conditional block 632), then control flow of method 620 moves to control block F, which is further described regarding method 800.

If the timer has not reached a predetermined threshold value (conditional block 632), then separate control logic may detect a long latency instruction in conditional block 634. If a long latency instruction is detected (conditional block 634), then control flow of method 620 moves to control block H, which is further described regarding method 700.

If no long latency instruction is detected (conditional block 634), then control flow of method 620 returns to conditional block 626. In one embodiment, only the test in conditional block 632 regarding a timer may be implemented. In another embodiment, both tests may be implemented, but the priority of the order of detection may be reversed.

Figure 6:
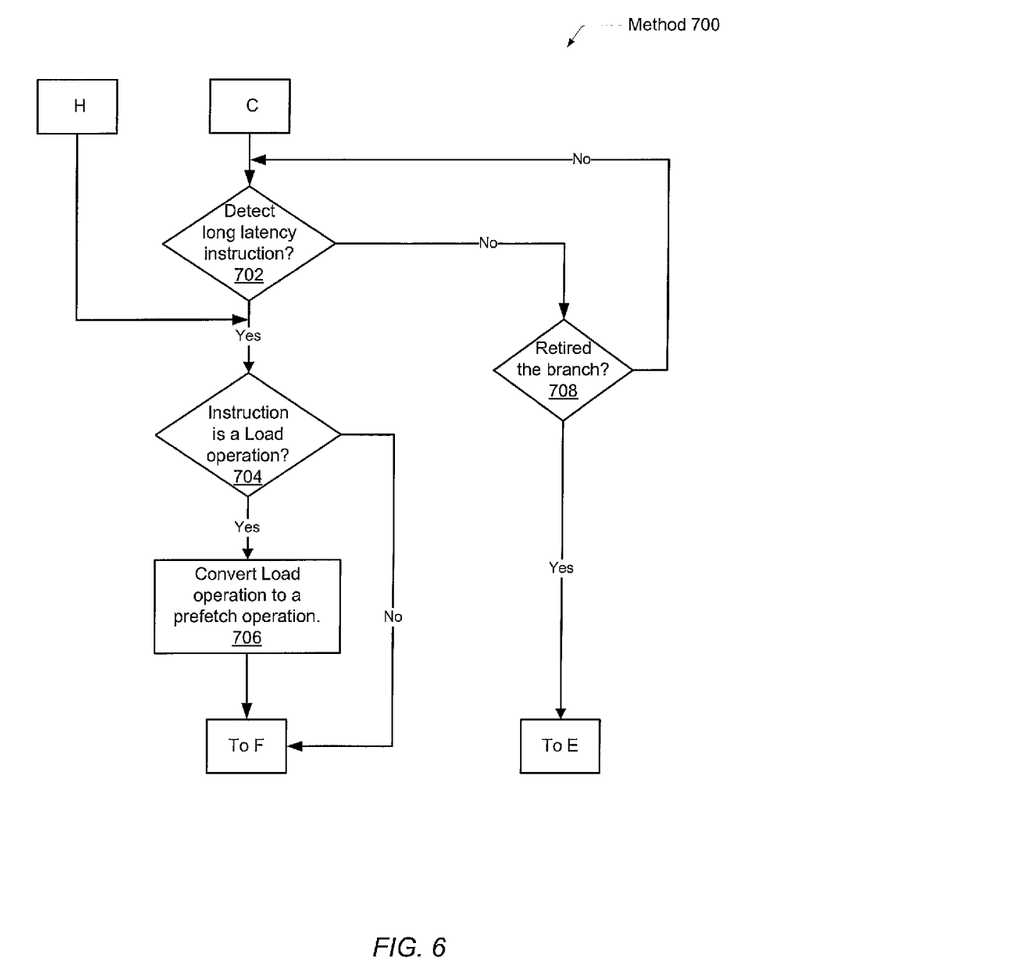
FIG. 6 is a flow diagram illustrating one embodiment of a method for detecting a long branch retirement due to a prior in program order long latency instruction.

Referring now to FIG. 6, one embodiment of a method 700 for detecting a long branch retirement due to a prior in program order long latency instruction is shown. In different embodiments, method 700 may occur simultaneously with method 600, with method 620, with both methods 600 and 620, or alone. In one embodiment, if no timers are used for reducing the branch misprediction penalty, then method 700 may be performed alone. In this case, there is no control transfer from methods 600 and 620 via control block H. Otherwise, it is possible the long latency instruction has been detected by these methods and control flow transfers to control block H.

When a branch instruction is determined to be mispredicted and control flow reaches control block C, control logic may detect a long latency instruction in conditional block 702. This control logic may be the same logic used for conditional blocks 610 and 634 of methods 600 and 620, respectively. In one embodiment, this control logic may detect a long latency instruction and set a bit in a corresponding register that is checked by methods 600 and/or 620. If timers are used and either method 600, method 620, or both methods are implemented, then control flow enters method 700 at control block H. Otherwise, if no timers are used, method 700 is implemented alone, and control flow enters method 700 at control block C.

As described before, a long latency instruction may be an instruction that requires a predetermined large number of clock cycles such as a multiply instruction, a divide instruction, a memory access instruction, such as a load or a store operation, that needs to access lower-level memory due to a cache miss; or other. If a long latency instruction is detected (conditional block 702), then control flow of method 700 moves to conditional block 704. Otherwise, control flow of method 700 moves to conditional block 708 wherein the mispredicted branch instruction may have retired. If it has retired (conditional block 708), then, in one embodiment, typical actions may be taken upon retirement of the mispredicted branch instruction such as flushing the entire pipeline and the working register file (WRF). The program counter (PC) value to use for instruction fetching may utilize the correct branch target address. Control flow of method 700 then moves to control block E.

If the long latency instruction is a load operation (conditional block 704), then the operation may be converted to a prefetch operation in block 706. By converting the load operation to a prefetch operation before the pipeline is flushed in a later step, system performance may improve. When the load instruction is later re-fetched and subsequently re-executed, the data requested by the load instruction may already be on its way into the caches in the case of a cache miss, thereby reducing the latency of the load instruction. Then control flow of method 700 moves to control block F, which is further described regarding method 800.

Figure 7:
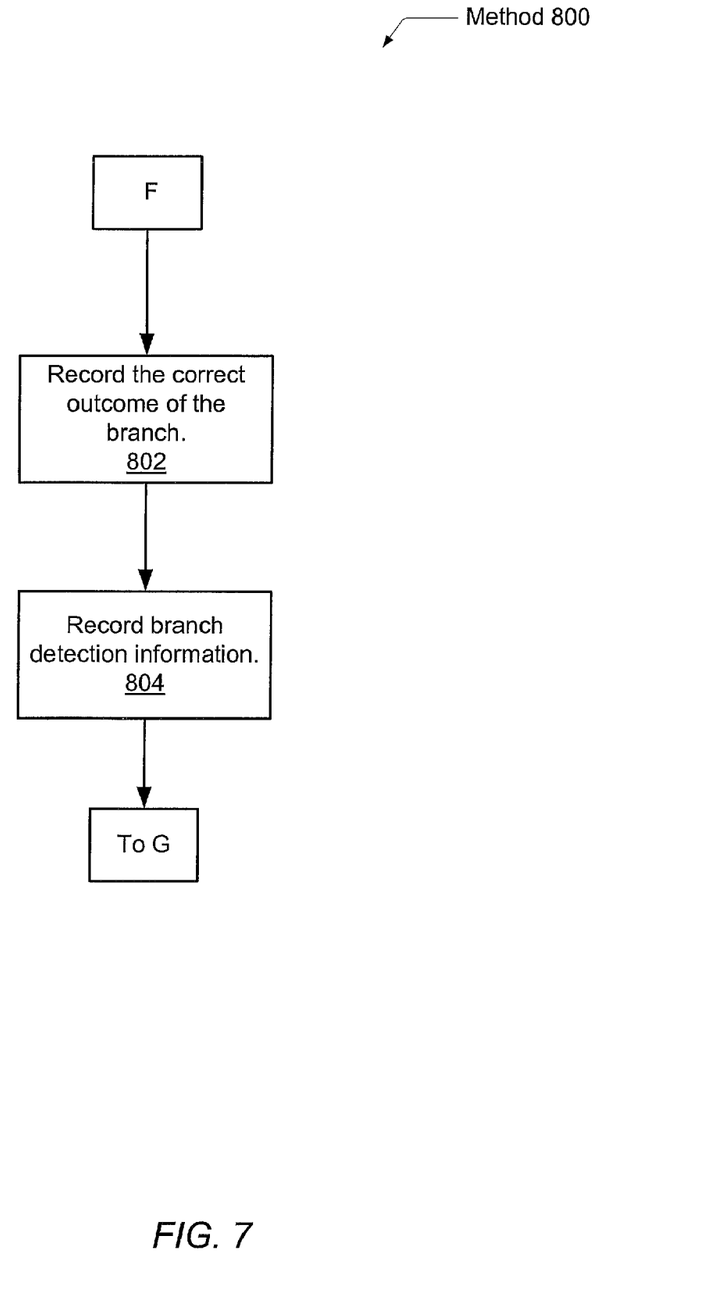
FIG. 7 is a flow diagram illustrating one embodiment of a method for storing non-speculative branch information.

Turning now to FIG. 7, one embodiment of a method 800 for storing non-speculative branch information is shown. When control flow reaches control block F, the correct outcome of the detected mispredicted branch instruction may be recorded in block 802. In one embodiment, the correct branch outcome, such as the correct taken/not-taken direction and a branch target address for a conditional branch or the correct target address for an indirect branch, of the mispredicted branch may be stored in the correct branch registers 338. For example, the outcome of the mispredicted branch may be saved in a Branch Outcome Buffer within registers 338. In one embodiment, the Branch Outcome Buffer may be implemented as two separate structures, wherein one structure is for storing outcomes for a conditional branch and a second structure is for storing outcomes for indirect branches. In another embodiment, the Branch Outcome Buffer may be implemented as a single integrated structure that stores outcomes for both conditional and indirect branches.

Figure 8:
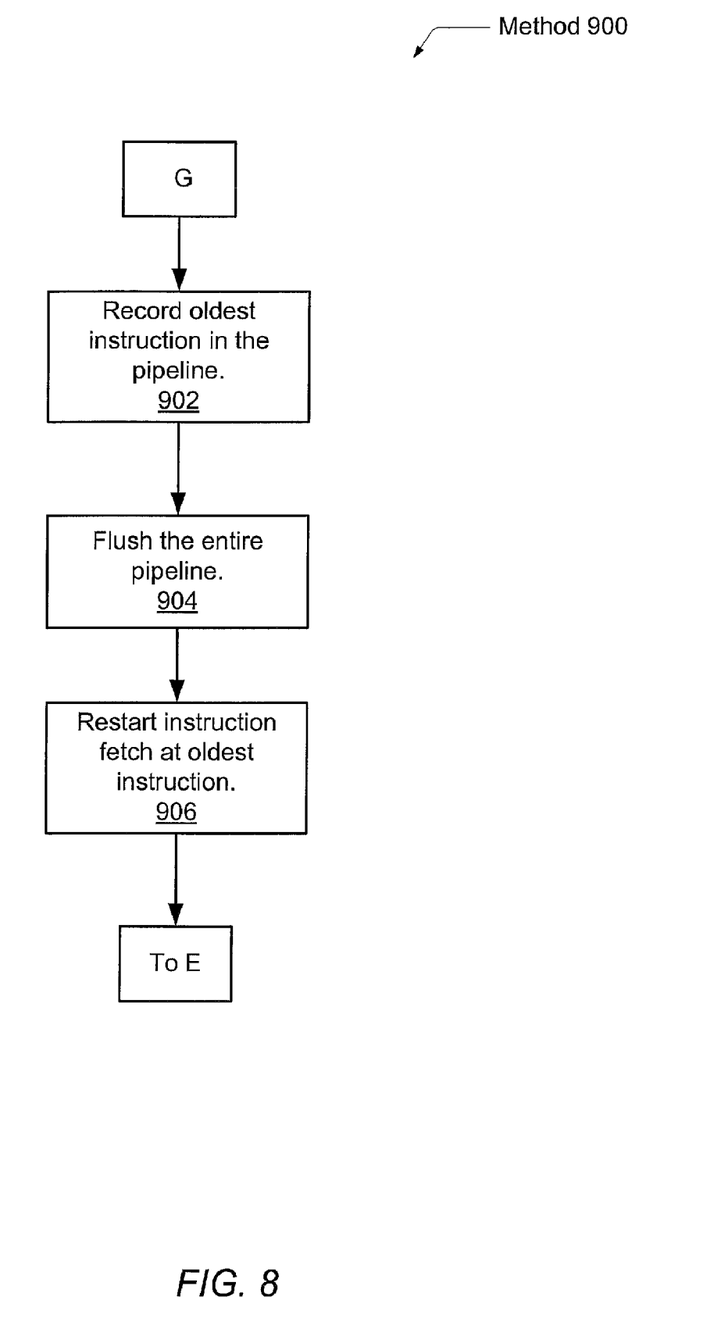
FIG. 8 is a flow diagram illustrating one embodiment of a method for flushing the entire pipeline.

The storage of the correct mispredicted branch outcome may help increase performance by bypassing the branch predictor 334 when the non-retired mispredicted branch is later re-executed. After a pipeline flush that occurs in subsequent method 900, when the instruction fetch unit 300 of the processor detects that a branch has been fetched, and the Branch Outcome Buffer is not empty, instead of relying on the prediction from the branch predictor 334, the Branch Outcome Buffer may be read to determine the correct branch direction and/or target address. As the branch outcome of each Branch Outcome Buffer entry is consumed, the entry may be removed from the Branch Outcome Buffer. The Branch Outcome Buffer may provide faster read access times than the branch predictor 334.

However, there may be one or more non-retired correctly predicted branches prior to the mispredicted branch in program order. The IFU 300 needs to know which re-fetched branch instruction corresponds to the data in the Branch Outcome Buffer. Branch detection information may be recorded in block 804 of method 800 prior to a flush of the pipeline.

In one embodiment, the value of a corresponding program counter (PC) value of the mispredicted branch may be stored in addition to the outcome of the mispredicted branch. After a pipeline flush, when the IFU 300 detects that a branch has been fetched and the PC of this fetched branch matches the stored value, instead of relying on a prediction from the branch predictor 334, the stored branch outcome is used to determine the branch direction and/or target address.

In another embodiment, the correct branch outcomes of any older non-retired branches are stored in the Branch Outcome Buffer in addition to the outcome of the mispredicted branch. Therefore, after a pipeline flush that occurs in subsequent method 900, when the IFU 300 detects that both a branch has been fetched and the Branch Outcome Buffer is not empty, instead of relying on the prediction from the branch predictor 334, the Branch Outcome Buffer is read to determine the correct branch outcome. As the branch outcome of each Branch Outcome Buffer entry is consumed, the entry is removed from the Branch Outcome Buffer.

In yet another embodiment, the number of any older non-retired branches may be stored in a Branch Count Register within registers 338. Therefore, after a pipeline flush that occurs in subsequent method 900, when the IFU 300 detects that both a branch has been fetched and the number of previous branches fetched after the pipeline flush is equal to the value in the Branch Count Register, instead of relying on the prediction from the branch predictor 334, the Branch Outcome Buffer is read to determine the correct branch outcome. As the branch outcome of each Branch Outcome Buffer entry is consumed, the entry is removed from the Branch Outcome Buffer.

After branch detection information is recorded in block 804, control flow of method 800 moves to control block G. Referring to FIG. 8, one embodiment of a method 900 for flushing the entire pipeline is shown. When control flow reaches control block G, the oldest non-retired instruction in the pipeline at that moment is recorded in block 902. In one embodiment, the corresponding address value for this instruction may be stored in the PC register of the core in order for a subsequent re-fetch. In another embodiment, a correct branch target address may be stored in the PC register of the core in the case the oldest instruction in the pipeline is the mispredicted branch instruction. The entire pipeline is flushed in block 904. Valid bits may be reset to signify empty entries in queues and registers.

Next, in block 906, the stored address of the previous oldest instruction in the pipeline, or the correct branch target address in the case the previous oldest instruction was the mispredicted branch instruction, may be sent out from the PC register to begin re-fetch of instructions. In the former case, instructions that occur earlier in program order than the previous mispredicted branch instruction, in addition to the mispredicted branch instruction, are all re-fetched and re-executed. In the latter case, the correct non-speculative instructions that occur later in program order than the previous mispredicted branch instruction are fetched and executed. The fetching and execution of these instructions may occur substantially earlier than if the core waited until the mispredicted branch instruction retired. Therefore, performance may appreciably increase.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
a memory configured to store instructions of a computer program; and
an instruction fetch unit (IFU) coupled to the memory, wherein the IFU is configured to:
predict an outcome of a branch instruction in a pipeline;
identify a predetermined condition prior to retirement of the branch instruction, responsive to detecting the branch instruction is mispredicted;
responsive to determining the predetermined condition is satisfied:
flush all instructions in the pipeline prior to retirement of the branch instruction; and
restart instruction fetch at an address which corresponds to an oldest instruction of said instructions;
wherein the IFU is configured to determine the predetermined condition is satisfied in response to detecting a first timer has reached a first predetermined threshold value, wherein the timer increments in response to the detection of the mispredicted branch and resets at a retirement of the mispredicted branch.

2. The computing system as recited in claim 1, wherein the IFU is further configured to determine the predetermined condition is satisfied in response to detecting a second timer has reached a second predetermined threshold value, wherein the second timer increments in response to detection of a retirement of a first instruction and resets at a retirement of a second instruction subsequent the first instruction.

3. The computing system as recited in claim 2, wherein the IFU is further configured to determine the predetermined condition is satisfied in response to detecting a long latency instruction, wherein the long latency instruction is an instruction requiring more clock cycles to complete than a predetermined latency threshold.

4. The computing system as recited in claim 3, further comprising converting the detected long latency instruction to a prefetch operation in response to detecting the long latency instruction is a load operation.

5. The computing system as recited in claim 1, wherein the IFU is further configured to store a correct outcome of the mispredicted branch instruction to be utilized during re-execution in place of an output of a branch predictor.

6. The computing system as recited in claim 5, wherein the IFU is further configured to store identification for identifying re-execution of the mispredicted branch, where the identification may comprise any of the following: a corresponding program counter address, a number of earlier in program order branch instructions, or outcomes of the earlier in program order branch instructions.

7. The computing system as recited in claim 1, further comprising:
   flushing only a front-end of the pipeline prior to a predetermined pipeline stage, in response to detecting the mispredicted branch instruction; and
   halting re-fetched instructions corresponding to a correct branch target address at the predetermined pipeline stage.

8. A method comprising:
   predicting an outcome of a branch instruction in a pipeline;
   identifying a predetermined condition prior to retirement of the branch instruction, in response to detecting the branch instruction is mispredicted;
   responsive to determining the predetermined condition is satisfied:
      flushing all instructions in the pipeline prior to retirement of the branch instruction; and
      restarting instruction fetch at an address which corresponds to an oldest instruction of said instructions;
   wherein determining the predetermined condition is satisfied in response to detecting a first timer reaches a first predetermined threshold value, wherein the timer increments in response to the detection of the mispredicted branch and resets at a retirement of the mispredicted branch.

9. The method as recited in claim 8 further comprising determining the predetermined condition is satisfied in response to a second timer reaches a second predetermined threshold value, wherein the second timer increments in response to a detection of a retirement of a first instruction and resets at a retirement of a second instruction subsequent the first instruction.

10. The method as recited in claim 9 further comprising determining the predetermined condition is satisfied in response to a detection of a long latency instruction, wherein the long latency instruction is an instruction requiring more clock cycles to complete than a predetermined latency threshold.

11. The method as recited in claim 10 further comprising converting the detected long latency instruction into a prefetch operation in response to the long latency instruction is a load operation.

12. The method as recited in claim 8 further comprising storing a correct outcome of the mispredicted branch instruction to be utilized during re-execution in place of an output of a branch predictor.

13. The method as recited in claim 12 further comprising storing identification for identifying the re-execution of the mispredicted branch, where the identification may comprise any of the following: a corresponding program counter address, a number of earlier in program order branch instructions, or outcomes of the earlier in program order branch instructions.

14. The method as recited in claim 8 further comprising:
   flushing only a front-end of the pipeline prior to a predetermined pipeline stage, in response to the detection of the mispredicted branch instruction; and
   halting re-fetched instructions corresponding to a correct branch target address at the predetermined pipeline stage.

15. An instruction fetch unit comprising:
   an interface configured to communicate with a memory; and
   circuitry configured to:
      predict an outcome of a branch instruction in a pipeline;
      identify a predetermined condition prior to retirement of the branch instruction, in response to detecting the branch instruction is mispredicted;
      responsive to determining the predetermined condition is satisfied:
         flush all instructions in the pipeline prior to retirement of the branch instruction; and
         restart instruction fetch at an address which corresponds to an oldest instruction of said instructions;
      wherein the circuitry is configured to determine the predetermined condition is satisfied in response to detecting a first timer reaches a first predetermined threshold value, wherein the timer increments in response to the detection of the mispredicted branch and resets at a retirement of the mispredicted branch.

16. The instruction fetch unit as recited in claim 15, wherein the circuitry is further configured to determine the predetermined condition is satisfied in response to a detection of a long latency instruction, wherein the long latency instruction is an instruction requiring more clock cycles to complete than a predetermined latency threshold.

17. The instruction fetch unit as recited in claim 16, wherein the circuitry is further configured to convert the detected long latency instruction into a prefetch operation in response to the long latency instruction is a load operation.

* * * * *